Feb. 26, 1935.   E. WATSON   1,992,644
BRAKE INDICATOR
Filed Jan. 2, 1934
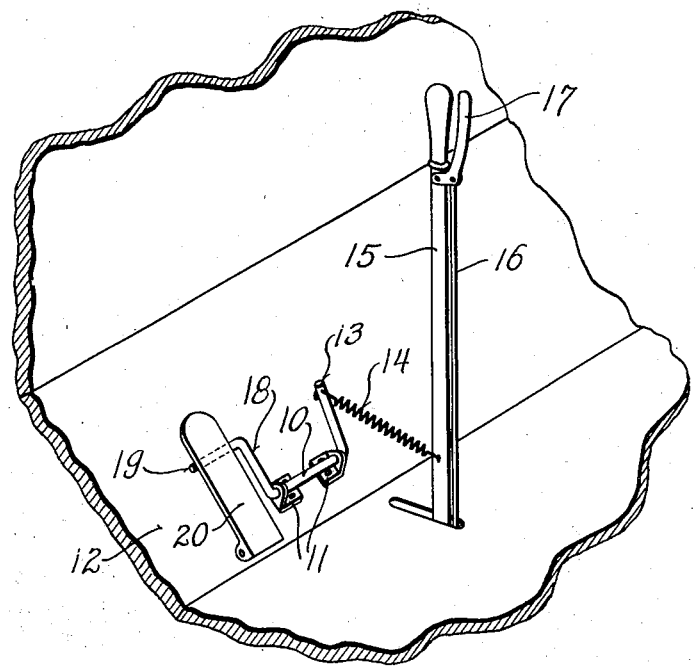
INVENTOR
*Ernest Watson*
BY
ATTORNEY Patented Feb. 26, 1935

1,992,644

UNITED STATES PATENT OFFICE 1,992,644

BRAKE INDICATOR

Ernest Watson, Wauwatosa, Wis.

Application January 2, 1934, Serial No. 704,812

4 Claims. (Cl. 188—2)

This invention relates to brake indicators for motor vehicles.

An object of the present invention is to provide an improved attachment for motor vehicle controls which will invariably function, when the emergency brake lever is "on" or partially "on", to surely and unavoidably apprise the driver of that fact, and thus prevent inadvertent starting and operation of the vehicle with the brake "on".

This I have accomplished by the provision of an attachment which, when the emergency brake is "on", will offer an abnormal, though preferably yieldable, resistance to the operation of one of the other control elements commonly used in starting.

Another object is to provide an attachment for this purpose of simple and economical design and capable of ready application, without change, to various types and makes of motor vehicles and particularly automobiles.

Other objects and advantages will appear, expressed or implied, from the following description of an illustrative embodiment of the present invention.

The single figure of the accompanying drawing is a perspective view of a brake indicator constructed in accordance with the present invention, and showing the same applied to an automobile floor board.

The brake indicator shown comprises a rock shaft 10, supported in appropriate bearing brackets 11 fixed to the automobile floor board 12, and having an upright actuating arm 13 at one end thereof.

In this instance the arm 13 is connected, through a spring 14, with the emergency brake lever 15 which is equipped with the usual ratchet mechanism (not shown) for releasably retaining the same in brake holding position under the control of a conventional rod 16 and lever 17.

A crank arm 18 on the other end of the shaft 10 is provided with an offset portion 19 positioned beneath another of the automobile control elements, such as the accelerator pedal conventionally indicated at 20.

The arrangement is such that, when the brake lever 15 is shifted rearwardly into the brake applying position shown, the spring 14 is automatically tensioned and, acting through the arm 13, shaft 10, arm 18, and portion 19, applies an upward pressure to the bottom of the accelerator pedal 20, so as to set up an abnormal though yieldable resistance to actuation of the accelerator. Due to the common use of the accelerator in starting and driving the vehicle, this abnormal resistance to its actuation provides a sure and unmistakable indication to the driver that the emergency brake lever has not been released and that the brake is "on".

The severe and unnecessary wear on the brake so commonly experienced by operation of the automobile with the brake inadvertently left "on" or partially "on" is thus effectively prevented. At the same time, however, the yieldability of this abnormal resistance does not prevent normal operation of the accelerator, so that it is possible to use the same while the brake is "on", whenever conditions warrant as, for instance, when starting on a hill.

Various changes may be made in the embodiment of the invention hereinabove specifically described without departing from or sacrificing the advantages of the invention as defined in the appended claims.

I claim:—

1. In a motor vehicle the combination with a plurality of separately actuated control elements therefor, including a brake lever having means for releasably retaining the same in brake applying position, of resilient means energized by movement of said lever into brake applying position to yieldably resist actuation of another of said control elements.

2. In a motor vehicle the combination of a brake lever having means for releasably retaining the same in brake applying position, an accelerator pedal, and resilient means responsive to movement of said lever into brake applying position for yieldably resisting actuation of said pedal.

3. In a motor vehicle the combination with a plurality of separately actuated control elements therefor, including a brake lever having means for releasably retaining the same in brake applying position, of a rockable element, a resilient connection between said element and said lever, and means on said element engageable with another of said elements to yieldably resist actuation of the latter when said lever is moved into brake applying position.

4. In a motor vehicle the combination of a brake lever, an accelerator pedal, a rockable member having an element positioned beneath said pedal, an actuating arm for said member, and a spring connection between said arm and lever through which said element is pressed upwardly against said pedal when said lever is shifted into brake applying position.

ERNEST WATSON.